United States Patent [19]

Evans

[11] 4,382,298
[45] May 3, 1983

[54] BINARY DIGIT OR BIT RESTORATION CIRCUIT

[75] Inventor: Michael W. Evans, Lynchburg, Va.

[73] Assignee: General Electric Company, Lynchburg, Va.

[21] Appl. No.: 248,493

[22] Filed: Mar. 27, 1981

[51] Int. Cl.³ ............................................. H03K 13/32
[52] U.S. Cl. ......................................... 371/6; 375/34; 455/63
[58] Field of Search ............... 371/6; 375/34; 455/63, 455/296

[56] References Cited

U.S. PATENT DOCUMENTS

| 3,366,930 | 1/1968 | Bennett et al. | 371/6 |
| 3,396,369 | 8/1968 | Brothman et al. | 371/6 |
| 3,449,716 | 6/1969 | Brothman et al. | 371/6 |
| 3,480,910 | 11/1969 | Brenza et al. | 371/6 |
| 3,523,278 | 8/1970 | Hinkel | 371/6 |
| 3,909,724 | 9/1975 | Spoth et al. | 371/6 |

Primary Examiner—Charles E. Atkinson
Attorney, Agent, or Firm—James J. Williams

[57] ABSTRACT

Relatively distorted bits are restored by sampling the bits for a plurality of times during each bit interval. A count of a first binary level of the samples is made for less than the bit interval, so as to eliminate samples at the transitions of the bits. If the count reaches a selected number, a regenerated bit of the first binary level is produced, and if the count does not reach the selected number, a regenerated bit of a second binary level is produced.

5 Claims, 2 Drawing Figures

BINARY DIGIT OR BIT RESTORATION CIRCUIT

BACKGROUND OF THE INVENTION

My invention relates to a signal restoration circuit, and particularly to a signal restoration circuit for accurately restoring distorted binary digits or bits to their original form.

Binary data is used extensively for signalling and information purposes. While such binary data has many advantages, it is subject to distortion or error, particularly when transmitted over a medium such as a radio system. Consequently, there is a need for an arrangement to restore the binary digits or bits to their original form.

Accordingly, a primary object of my invention is to provide a binary digit or bit restoration circuit.

Another object of my invention is to provide a new and improved circuit that accurately restores received bits to their original form despite severe distortion of the bits by the transmission medium.

Another object of my invention is to provide a new and improved bit restoration circuit that can be implemented with digital circuits.

In addition to being subject to distortion during transmission, binary digits or bits are liable to be improperly interpreted or detected at their leading and trailing edges when the relevant circuits are responding to those edges.

Accordingly, another object of my invention is to provide a new and improved bit restoration circuit which, in determining the logic of received bits, omits consideration of the bits in the vicinity of their leading and trailing edges.

SUMMARY OF THE INVENTION

Briefly, these and other objects are achieved in accordance with my invention by a bit restoration circuit which uses clock pulses to sample each received bit for a plurality of times during a selected central portion removed from the leading and trailing edges of each bit. Samples representing a logic 1 are counted, and if the count reaches a predetermined value, a restored logic 1 is produced by a flip-flop. If the count does not reach the predetermined value, a restored logic 0 is produced by the flip-flop. Thus, relatively accurate restoration of binary digits or bits is provided, despite distortion of the bits during transmission.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

In binary data transmission systems, logic 1's and 0's (which may be represented by any suitable frequencies or voltage levels) are transmitted sequentially to a receiver. Typically, there is no additional circuit or path to transmit a separate synchronization signal, so that the receiver includes a bit timing circuit that reproduces or regenerates accurate signals representing the bit timing. A number of arrangements for reproducing the bit timing have been devised, one of which is shown and described on pages 260–261 of "Data Transmission" by Bennett and Davey, McGraw Hill Company, 1965. The information shown on pages 260–261 is herein incorporated specifically by reference. As shown on those pages, a high speed clock (64× the bit rate) is provided, and these clock pulses are counted by a local counter and an output derived from its most significant or output stage. The number of clock pulses counted is increased or decreased as a function of the transition time of the counter output and the transition time of the received binary data bits. If a counter output stage transition is delayed or behind the received bit transition, additional clock pulses are applied to the counter input. If a counter output stage transition is advanced or ahead of the received bit transition, clock pulses are deleted from the counter input. Thus, an accurate bit timing signal is produced. As mentioned above, a bit timing circuit is usually present in a binary data receiver. In accordance with my invention, I utilize the signals present in such a bit timing circuit with my bit restoration circuit. In particular, I make use of this circuit to produce a clear pulse at the beginning of each bit, and to produce a read pulse just before the end of each bit. The clear and read pulses can be derived in any convenient way, such as with logic gates connected to appropriate counter stages, in synchronization with the counter output stage.

Figure 1:
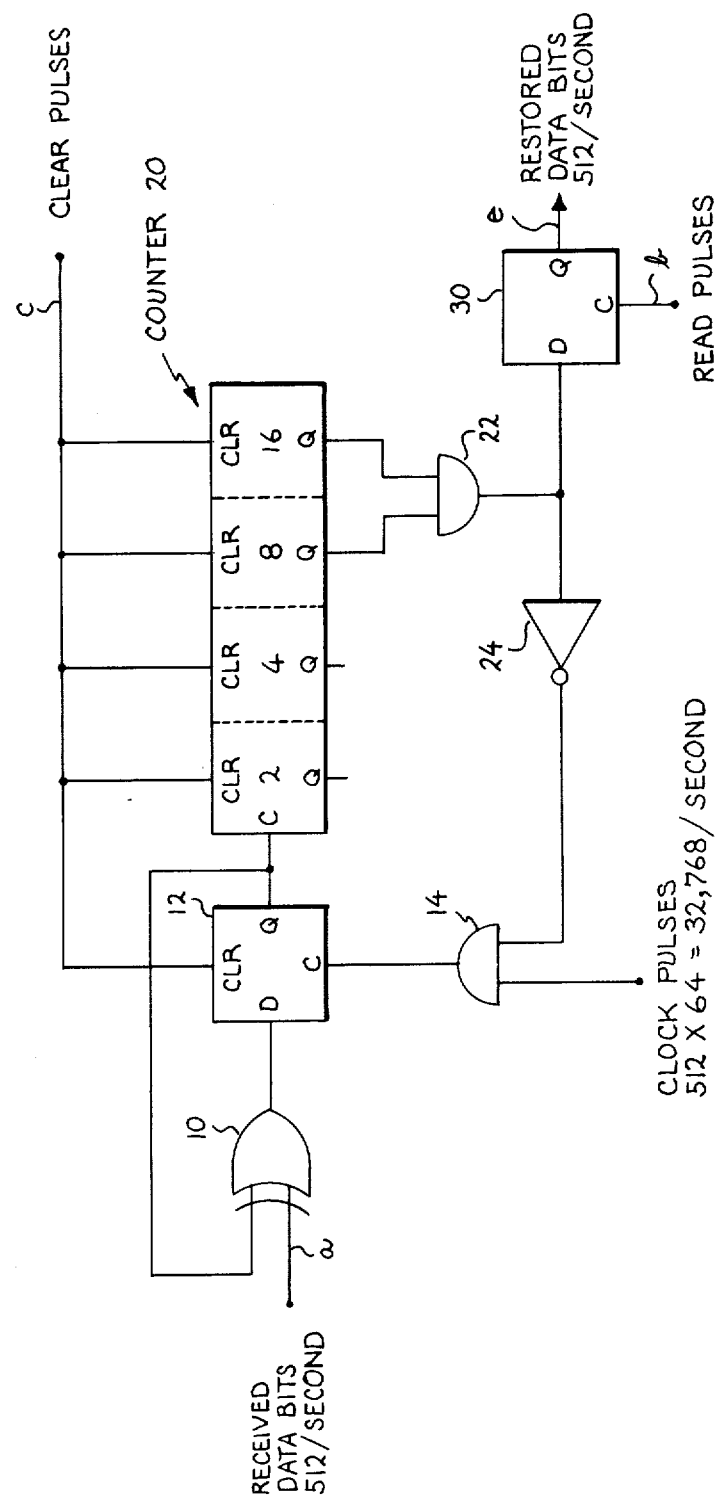
FIG. 1 shows a circuit diagram of an improved bit restoration circuit in accordance with my invention.

FIG. 1 shows a circuit diagram of a preferred embodiment of my bit restoration circuit. To make the explanation of this circuit more understandable, I have assumed that the received bits occur at the rate of 512 bits per second, and that the clock pulses are produced at a rate of 512×64 or 32,768 pulses per second. These assumed values are compatible with the bit timing circuit described in the reference above. However, persons skilled in the art will appreciate that my bit restoration circuit can be used with bits and clock pulses having any desired speed or rate.

The received bits to be restored are applied to a first input of an EXCLUSIVE OR gate 10. The output of the gate 10 is applied to the D input of a D flip-flop 12 which is supplied at its clock input C with clock pulses. These clock pulses are applied to a first input of an AND gate 14 which passes or blocks these pulses to the clock input C as a function of a signal at a second input of the AND gate 14. The Q output of the flip-flop 12 is applied to the second input of the EXCLUSIVE OR gate 10 to form a circuit that causes the flip-flop 12 to produce a transition at its Q output in response to each clock pulse when the received bit is a logic 1, but to produce no transition at its Q output when the received bit is a logic 0. This Q output is also applied to the clock input C of a four stage counter 20. These four stages represent binary counts of 2, 4, 8 and 16. The flip-flop 12 and the counter 20 have clearing or reset inputs CLR for clearing or reset pulses. The Q outputs of the 8 and 16 count stages are applied to the two inputs of an AND gate 22. The output of the AND gate 22 is coupled through an inverter 24 to the second input of the AND gate 14, and is also coupled to the D input of a D type output flip-flop 30. The clock input C of the flip-flop 30 is supplied with read pulses. The restored data bits are derived from the Q output of the flip-flop 30.

OPERATION

The operation of my circuit of FIG. 1 will be explained in connection with the waveforms shown in FIGS. 2a through 2e, and plotted along a common time axis. FIGS. 2a, 2b, 2c, and 2e represent waveforms at similarly designated points in FIG. 1.

Figure 2:
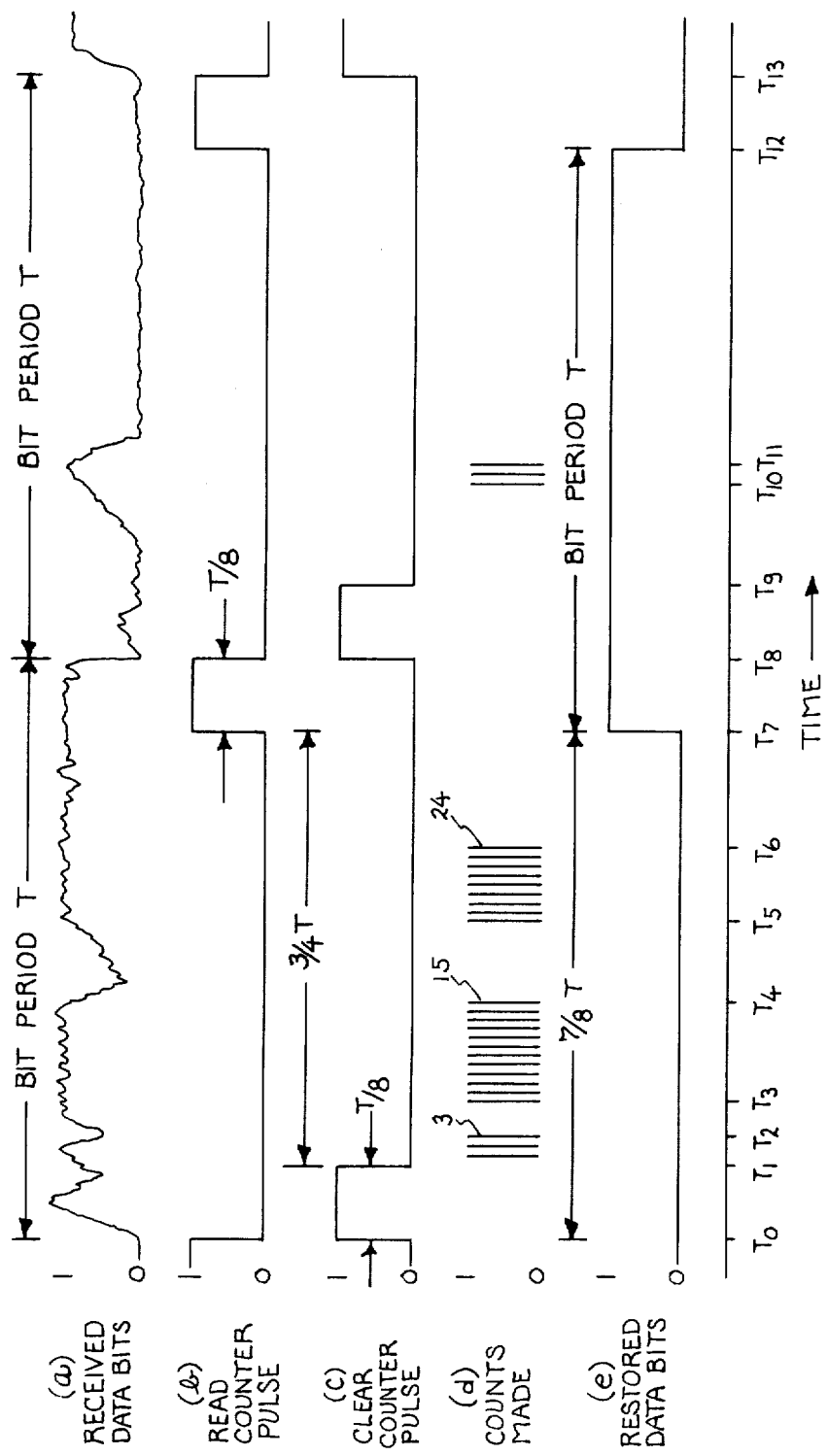
FIGS. 2a through 2e show waveforms for illustrating the operation of my bit restoration circuit of FIG. 1.

FIG. 2a shows typical received data bits with noise or distortion. For purposes of explanation, I have assumed that these bits occur at the rate of 512 per second and have a period T of approximately 0.00195 second. I have assumed that samples of the bits are taken at the rate of 64×512 or 32,768 per second. I have also assumed that a logic 0 bit has just ended and is followed by a logic 1 bit, followed by a logic 0 bit. At the time T0, the received bit switches from a logic 0 to a logic 1. From time T0 to T1, the flip-flop 12 and counter 20 are held in the logic 0 state by a clear pulse applied to the inputs CLR. At the time T1, the AND gate 14 is receiving a logic 1 from the inverter 24 so that the gate 14 passes the clock pulses to the clock input C of the flip-flop 12. With the received bit a logic 1, the clock pulses cause the flip-flop 12 to produce pulses at one-half the assumed rate of the clock pulses, namely 16,384 per second.

Between the times T1 and T7 the counter 20 and the flip-flop 12 count the samples of logic 1. These counts are illustrated in FIG. 2d. Between the times T1 and T2, three counts are made. Immediately after the time T2, a noise hit is received on the data bit making it appear as a logic 0, so that no count is made. The data bit is restored to logic 1 at the time T3, so that more counts are made to provide a count of 15 at the time T4. At this time T4, another noise hit is received and no more counts are made until the time T5. After the time T5, the data bit maintains a fairly stable logic 1, so that additional counts are made until the time T6, when a total count of 24 is made by the counter 20. When this occurs, the Q outputs of the 8 and 16 count stages both become a logic 1, so that the AND gate 22 produces a logic 1. This causes the inverter 24 to produce a logic 0 which blocks the AND gate 14 so that no more clock pulses are applied to the clock input C of the flip-flop 12. This prevents the counter 20 from reaching a count of 32 which would reset the counter 20. Hence, the count of 24 (8+16) is maintained. The logic 1 produced by the AND gate 22 is also applied to the D input of the flip-flop 30. At the time T7, a read counter pulse is provided as shown in FIG. 2b. This pulse causes the flip-flop 30 to produce a logic 1 at its Q output as shown in FIG. 2e. Since this pulse is locally produced and not subjected to a noisy transmission medium, it is sharp and accurate. Since the read pulse occurs at T/8 before the end of a bit period T, the restored bit has a lag or delay of 7/8T but continues for the period T (i.e. from T7 to T12). And with a clear pulse of T/8 at the beginning of a bit period, the available time or window for samples is T−T/8−T/8, or ¾T.

At the bit transition time T8, a clear counter pulse is produced. This resets the flip-flop 12 and counter 20. This pulse is removed at the time T9 to permit the flip-flop 12 and counter 20 to function. Since the next assumed bit beginning at the time T8 is a logic 0, normally no counts would be made. However, I have also assumed that a noise hit between the times T10 and T11 makes it appear as though a logic 1 is present, so that three counts are accumulated. However, no further counts are accumulated and at the time T12 for a read pulse, both inputs to the AND gate 22 are at a logic 0. This causes a logic 0 to be supplied to the D input of the flip-flop 30 so that when the read pulse is applied at the time T12, the flip-flop 30 produces a logic 0 which continues for the period T. At the time T13, a clear counter pulse is supplied to remove any counts which may be present in the counter 20.

In summary, it will be seen that I have provided means for sampling the receive data bits after one-eighth of a bit period, and before the last one-eighth of the same bit period. Thus, my sampling occurs in the middle three-fourths of each bit, and eliminates any adverse effects of bit transition. It should also be noted that I have arbitrarily selected a count of 24 out of a possible 48 logic 1's as a basis for causing my circuit to produce a restored logic 1. If the count is less than 24, my circuit provides a restored logic 0.

Persons skilled in the art will appreciate that many modifications may be made to my invention. For example, other fractions of a bit period may be used to prevent counting. For example one-fourth of a bit period may be used at each end so that only the central half of a bit period is considered. Likewise, different numbers of samples can be taken, and different thresholds or levels of count can be used to determine or decide whether the samples represent a logic 1 or a logic 0. For example, a count of 32 out of a possible 48 in the central portion could be required to produce a logic 1. And, of course, other sampling rates per bit can be utilized. For example, 128 samples could be taken during a bit period. However, all of these are matters of design and choise. And finally, persons skilled in the art will appreciate that the logic 1 and logic 0 used in explaining my circuit can be represented by any levels of signal. Therefore, while my invention has been described with reference to a particular embodiment, it is to be understood that modifications may be made without departing from the spirit of the invention or from the scope of the claims.

What I claim as new and desire to secure by Letters Patent of the United States is:

1. An improved circuit for regenerating relatively accurate two-level bit pulses of predetermined period T from distorted two-level bit pulses of said period T comprising:
   a. means for sampling the level of said distorted bit pulses a selected plurality of times during each of said periods T;
   b. means coupled to said sampling means for counting said samples of a first selected level during the interval beginning a first period of time later than the beginning of each period T and ending a second period of time earlier than the ending of each period T, said counting means being reset prior to each of said intervals, and said counting means being maintained in a fixed condition in response to a predetermined count being reached during each of said intervals;
   c. and output means coupled to said counting means for producing a bit pulse of period T having said first selected level in response to at least said predetermined count and for producing a bit pulse of period T having a second selected level in response to less than said predetermined count.

2. The improved circuit of claim 1 wherein said periods of time are both T/N, where N is greater than two.

3. The improved circuit of claim 1 or claim 2 and further comprising clock means that produce pulses whose period is T/R, where R is a multiple of two, and means for applying said clock produced pulses to said sampling means.

4. A circuit for producing relatively undistorted binary digits or bits from relatively distorted input binary digits or bits comprising:
   a. a binary counter having N stages, where N is an integer, a first input for said relatively distorted input bits, a second input for clock pulses, and a clearing pulse input;
   b. a source of clock pulses having a rate that is at least $2^{N+1}$ times the rate of said relatively distorted input bits;
   c. first means for coupling said source of clock pulses to said second counter input for causing said binary counter to count the number of clock pulses applied to said second counter input in response to a relatively distorted input bit of logic 1 applied to said first counter input;
   d. second means for applying a clearing pulse to said counter clearing pulse input for the first $2^{N+1}/C$ clock pulses occurring after the beginning of each relatively distorted input binary bit, where C is a number greater than two;
   e. third means coupled to the output of at least the most significant count stage of said binary counter for sensing the count therein;
   f. fourth means coupling said third means to said first means for passing said clock pulses to said second counter input in response to the absence of a clock count in said most significant stage, and for blocking said clock pulses from said second counter input in response to the presence of a clock count in said most significant stage;
   g. and fifth means coupled to said third means for producing relatively undistorted bits of logic 1 in response to the presence of said clock count in said most significant stage, and for producing relatively undistorted bits of logic zero in response to the absence of said clock count in said most significant stage.

5. The circuit of claim 4 wherein said fifth means produces said relatively undistorted bits beginning $2^{N+1}/D$ clock pulses before the end of each relatively distorted input bit, where D is a number that is greater than two.

* * * * *